United States Patent [19]

Batjukov et al.

[11] 4,202,727
[45] May 13, 1980

[54] GRIPPING MEANS FOR FUEL ASSEMBLIES OF NUCLEAR REACTOR

[76] Inventors: Vladimir I. Batjukov, ulitsa Prygunova, 9, kv. 29; Oleg N. Vijugov, ulitsa Novaya, 24, kv. 2; Alexandr I. Fadeev, ulitsa Engelsa, 21, kv. 46; Alexandr F. Shapkin, ulitsa Zvezdinka, 3, kv. 64; Lev E. Dyatlov, ulitsa Kuibysheva, 45, kv. 53, all of Gorky, U.S.S.R.

[21] Appl. No.: 835,582

[22] Filed: Sep. 22, 1977

[51] Int. Cl.² ............... G21C 19/20; B66C 17/08; B66C 1/10
[52] U.S. Cl. ............... 176/30; 294/86 A; 414/146
[58] Field of Search ............ 176/30; 214/18 N; 294/86 A

[56] References Cited

U.S. PATENT DOCUMENTS

| | | | |
|---|---|---|---|
| 3,295,883 | 1/1967 | Dupuy | 176/30 |
| 3,337,257 | 8/1967 | Brnsvold | 176/30 |
| 3,629,069 | 12/1971 | Wright | 176/30 |
| 3,795,420 | 3/1974 | Preston | 176/30 |

*Primary Examiner*—Charles T. Jordan
*Assistant Examiner*—Donald P. Walsh
*Attorney, Agent, or Firm*—Fleit & Jacobson

[57] ABSTRACT

Disclosure is made of a gripping mechanism which comprises a casing mounted on the housing of the gripping mechanism and displaceable with respect to the housing. One end face of the casing interacts with a spring arranged on the housing, whereas the other end face of the casing carries a cap whose shape corresponds to that of the contact surface of a fuel assembly's head. The length of the casing is selected so that when the head of a fuel assembly is gripped by gripping jaws pivotably mounted on a slider accommodated in the housing, the end face of the cap comes into contact, under the action of the spring, with the contact surface of the fuel assembly's head, thus forming a closed circuit for passage of the cooling medium through the cavity of the slider and casing and through the head of the fuel assembly into the fuel assembly.

4 Claims, 5 Drawing Figures

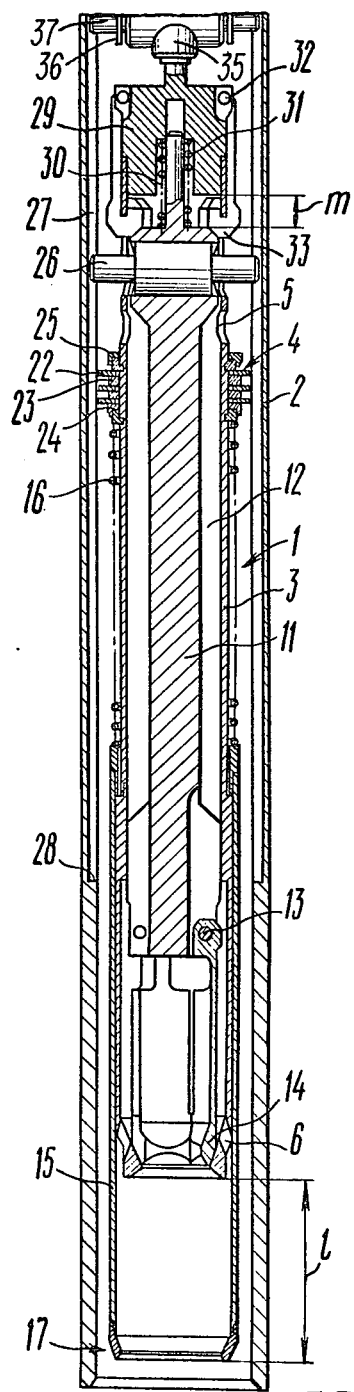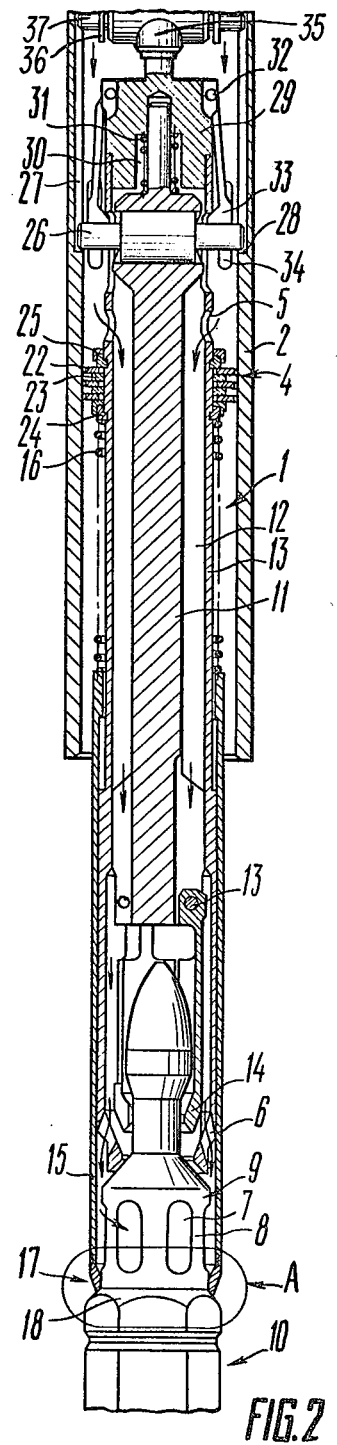

GRIPPING MEANS FOR FUEL ASSEMBLIES OF NUCLEAR REACTOR

The present invention relates to nuclear reactor refuelling machines and, more particularly, to gripping means for fuel assemblies of nuclear reactors.

The invention can be effectively employed in fuel recharging equipment of nuclear reactors whose spent fuel assemblies have much afterheat, which makes it necessary to circulate the cooling medium through the internal cavity of a fuel assembly being handled. The head of such a fuel assembly is provided with an outer projection or an internal slot to engage with the gripping jaws.

There is known a gripping means for fuel assemblies of a nuclear reactor, comprising a housing with a sealing member on its outer surface and apertures for passage of the cooling medium through the head of a spent fuel assembly into its internal cavity to remove the afterheat. The gripping means further includes a slider accommodated in said housing and adapted for movement relative to the latter. The slider has a cavity for passage of the cooling medium. On said slider there are pivotably mounted gripping jaws which interact with the housing to grip and release the head of a fuel assembly, as the slider and the housing are displaced in relation to each other.

As the gripping means transfers a spent fuel assembly, a greater part of the cooling medium flow is directed into the internal cavity of said spent fuel assembly through the apertures provided in the housing of the gripping means, the cavity of the slider, and the fuel assembly's head. This is done with the aid of the sealing member mounted on the outer surface of the gripping means' housing. With the gripping means arranged in the guide tube of a nuclear reactor's refuelling machine, said sealing member closes the gap between the internal surface of the guide tube and the housing of the gripping means, and directs the flow of the cooling medium through the apertures provided in the gripping means' housing and through the slider's cavity into the internal cavity of the fuel assembly being handled. However, there are considerable gaps between the end faces of the gripping means and the fuel assembly, as well as between the gripping jaws and the slider at the points where said gripping jaws are mounted on said slider. The presence of these gaps accounts for a great flow rate of the cooling medium as it passes through these gaps into the gap between the outer surface of the fuel assembly and the internal surface of the guide tube. The hydraulic resistance of the internal cavity of the fuel assembly is much greater than that of the gap between the fuel assembly and the guide tube; as a result, a greater part of the cooling medium is directed into the latter gap, whereas only a smaller part of that flow gets into the internal cavity of the fuel assembly.

The removal of afterheat by passing the cooling medium through the internal cavity of a fuel assembly is far more effective than the removal of afterheat by passing the cooling medium along the outer surface of the fuel assembly; as a result, a decrease in the flow rate of the cooling medium passing through the internal cavity of the fuel assembly may be the cause of impermissible overheating and ensuing damage of the fuel assembly.

It is an object of the present invention to ensure effective removal of afterheat from a spent fuel assembly being handled and rule out overheating of said spent fuel assembly which otherwise could be damaged.

The obejct of the invention is attained by providing a gripping means for fuel assemblies of a nuclear reactor, comprising a housing with a sealing member on its outer surface and apertures for passage of the cooling medium through the head of a fuel assembly into the latter's internal cavity, a slider accommodated in the housing and adapted for movement relative to said housing, said slider having a cavity for passage of the cooling medium and gripping jaws pivotably mounted on said slider, said gripping jaws interacting with the housing to grip and release the head of a fuel assembly being handled as the slider and the housing are displaced relative to each other, which gripping means further includes, according to the invention, a casing mounted on the housing of the gripping means and adapted for movement with respect to said housing, one end face of said casing interacting with a spring arranged on the housing, whereas its other end face carries a cap whose shape corresponds to that of the contact surface of the fuel assembly's head, the length of said casing being selected so that as the gripping jaws grip the head of the fuel assembly, the end face of the cap interacts, under the action of the spring, with the contact surface of the head, thus forming a closed circuit for passage of the cooling medium through the cavity of the slider and the casing of the gripping means and through the head of the fuel assembly into the latter's internal cavity.

It is desirable that the cap should be integral with the casing.

If the contact surface of the fuel assembly's head is a cone-shaped projection, it is expedient that the surface of the cap's end face should be cone-shaped so as to come into contact with the cone-shaped projection; it is further expedient that the cap's end face should be provided with a spherical collar to come into contact with the cylindrical portion of the head, conjugated with its contact surface.

The foregoing design of a gripping means for fuel assemblies of a nuclear reactor effectively prevents overheating of fuel assemblies being handled, which otherwise could damage the fuel assemblies.

Other objects and advantages of the present invention will be more readily understood from the following detailed description of preferred embodiments thereof to be read in conjunction with the accompanying drawings, wherein:

FIG. 1 is an elevation view of a gripping means for fuel assemblies of a nuclear reactor, in accordance with the invention;

FIG. 2 is an elevation view of the gripping means of FIG. 1, taken at the start of gripping the head of a spent fuel assembly;

Figure 3:
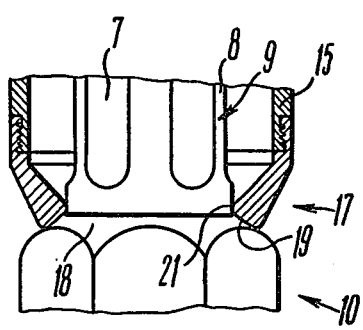
FIG. 3 is a magnified view of the area A of FIG. 2.

Referring to the attached drawings, the proposed gripping means 1 (FIG. 1) for fuel assemblies of a nuclear reactor is accomodated, according to the invention, in a manipulator tube 2 of a nuclear reactor's refuelling machine. The gripping means 1 is adapted for motion with respect to said manipulator tube 2. (To avoid unnecessary details, the nuclear reactor's refuelling machine is not shown in the drawings; nor is it dealt with in the text of the disclosure). The manipulator tube 2 is installed in the refuelling machine so that it can move up and down.

The gripping means 1 (FIG. 2) comprises a housing 3 with a sealing member 4 on its outer surface and apertures 5 and 6 for passage of the cooling medium, as shown by the arrows, from the internal cavity of the manipulator tube 2 to apertures 7 provided in a cylindrical portion 8 of a head 9 of a spent fuel assembly 10 into the internal cavity of said spent fuel assembly 10.

The housing 3 (FIG. 1) accomodates a slider 11 which is adapted for motion with respect to the housing 3. The slider 11 is provided with an internal cavity 12 for passage of the cooling medium through the apertures 5 and 6 of the housing 3 to the apertures 7 (FIG. 2) of the head 9.

Pivotally mounted on the slider 11 (FIG. 1) by means of axles 13 are three gripping jaws 14 (the drawing shows only two gripping jaws, while the third is beyond the plane of the drawing). There must be at least two gripping jaws 14. The gripping jaws 14 (FIG. 2) interact with the housing 3 to grip and release the head 9 of the fuel assembly 10 as the slider 11 and the housing 3 move relative to each other.

On the housing 3 (FIG. 1) there is mounted a casing 15 which is adapted for displacement in relation to said housing 3. One end face of the casing 15 interacts with a spring 16 arranged on the housing 3, whereas its other end face carries a replaceable cap 17 (FIGS. 2 and 3) whose shape corresponds to that of a contact surface 18 of the head 9 of the fuel assembly 10, conjugated with its cylindrical portion 8.

The length of the casing 15 (FIG. 2) is selected so that as the gripping jaws 14 grip the head 9 of the fuel assembly 10, an end face 19 (FIG. 3) of the cap 17 comes into contact with the contact surface 18 of the head 9, thus forming a closed circuit for passage of the cooling medium from the manipulator tube 2 (FIG. 2) through the internal cavity of the housing 3 and the casing 15 of the gripping means and through the apertures 7 of the head 9 into the internal cavity of the fuel assembly 10.

A replaceable cap is recommended for nuclear reactors whose fuel assemblies have contact surfaces of different shapes, in which case there can be an appropriate cap for each shape of a fuel assembly's contact surface.

Figure 4:
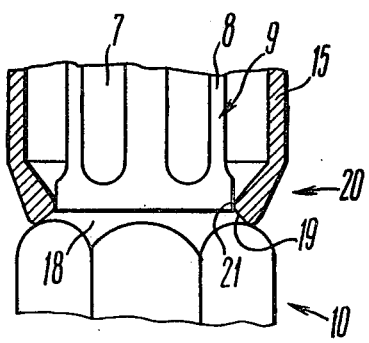
FIG. 4 is a magnified elevation view of a portion of the casing of the gripping means and a fuel assembly's head of another preferred embodiment of a gripping means for fuel assemblies of a nuclear reactor, in accordance with the invention.

If the contact surfaces of all the fuel assemblies are of the same shape, it is desirable that the cap 20 (FIG. 4) should be made integral with the casing 15.

If the contact surface 18 (FIG. 3) of the head 9 is a cone-shaped projection, the surface of the end face 19 of the cap 17 is also cone-shaped so as to come into contact with the cone-shaped projection, and is provided with a spherical collar 21 to come into contact with the cylindrical portion 8 of the head 9.

The sealing member 4 (FIG. 1) is mounted on the outer surface of the housing 3 and composed of three sealing rings 22 spaced from one another by washers 23 and making up a labyrinth seal. The sealing rings 22 and the washers 23 are secured on the housing 3 by means of two locking rings 24. Each of the locking rings 24 is sunk into the body of the housing 3 and diametrically split into two equal portions. Each of the two pairs of half-rings thus formed is secured on the housing 3 by means of two holders 25. The sealing rings 22 overlap the gap between the internal surface of the manipulator tube 2 and the housing 3 of the gripping means 1 and direct the flow of the cooling medium into the apertures 5.

On the slider 11 there are mounted thrust pins 26 which come into contact with longitudinal grooves 27 provided on the internal surface of the manipulator tube 2. The grooves 27 are rectilinear and extend in parallel with the axis of the manipulator tube 2. The grooves 27 come to an end at some distance from the end of the manipulator tube 2; the end walls of the grooves 27 serve as supporting surfaces 28.

Figure 5:
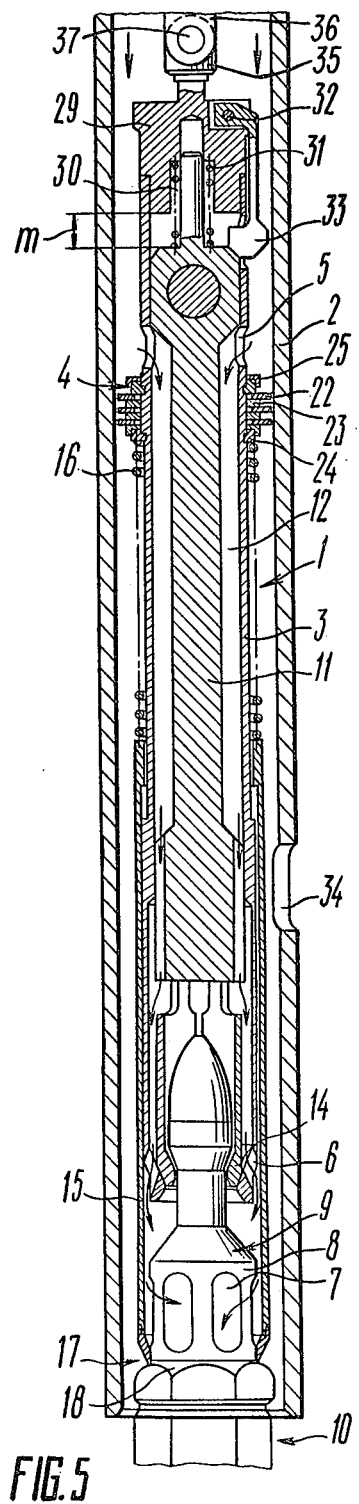
FIG. 5 is an elevation view of the gripping means of FIG. 1, taken in the plane perpendicular to that of FIG. 1, as a spent fuel assembly is being transferred.

The housing 3 has a support 29 having a hole 30 to receive a spring 31 interacting with the slider 11. Pivotally mounted by means of axles 32 on the support 29 (FIGS. 2 and 5) are locking means 33 which interact with the slider 11 and are forced by the latter into apertures 34 (FIG. 5) provided in the manipulator tube 2, as the thrust pins 26 abut against the supporting surfaces 28. The support 29 (FIG. 1) is coupled by means of a shackle 35 to a chain 36 (the drawing shows a portion of one link of said chain 36) which serves to connect the gripping means 1 to the refuelling machine's drive and thus set it into advance motion inside the manipulator tube 2. All the links of the chain 36 have axles 37 received in the longitudinal grooves 27 of the manipulator tube 2.

The operating principle of the proposed gripping means of a nuclear reactor's refuelling machine is as follows.

In the initial state, the gripping means 1 is fully inside the manipulator tube 2, where it is suspended on the chain 36. Under the action of the spring 16, the casing 15 is spaced at a distance 1 from the end face of the housing 3.

Under the action of the spring 31, which interacts with the slider 11, the gripping jaws 14 are pressed against the housing 3 and closed. Between the slider 11 and the support 29 there is a gap m which accomodates the locking means 33 abutting against the slider 11 and preventing the latter's movement in relation to the housing 3.

The refuelling machine's drive lowers the chain 36 and the gripping means 1 in the manipulator tube 2; the thrust pins 26 of the slider 11 abut against the supporting surfaces 28 of the longitudinal grooves 27. The slider 11 is stopped, while the housing 3 with the support 29 and the casing 15 continue to go down narrowing the gap m; the end of the slider 11 (FIG. 2) eventually comes into contact with the support 29 so that m=0. As this takes place, the locking means 33 are forced by the slider 11 from the gap m into the apertures 34 of the manipulator tube 2.

Due to the movement of the housing 3 in relation to the stationary slider 11, the gripping jaws 14 are disconnected from the housing 3 and are free to turn about the axles 13 to encompass and grip the head 9 of the fuel assembly 10. The gripping means 1 is thus prepared to grip the fuel assembly 10.

The refuelling machine lowers the manipulator tube 2 with the gripping means 1. The head 9 of the fuel assembly 10 is brought into the casing 15 and the housing 3 and gripped by the gripping jaws 14. Simultaneously, the spherical collar 21 (FIG. 3) of the cap 17 or 20 (FIG. 4) of the casing 15 comes into contact with the cylindrical surface 8 of the head 9, whereas the end face 19 of the cap 17 or 20 abuts against the contact surface 18 of the head 9. The casing 15 (FIG. 2) is stopped, while the housing 3 continues to go down, whereby the distance 1 is reduced and the spring 16 is compressed. The spring 16 ensures a good contact between the end face 19 and the contact surface 18, which reduces the flow rate of the cooling medium along the outer surface of the fuel assembly 10 and increases the flow rate of the cooling medium directed through the apertures 7 into the internal cavity of the fuel assembly 10.

As the head 9 is gripped by the gripping jaws 14, the chain 36 (FIG. 5) and the gripping means 1 go up and are drawn into the manipulator tube 2. The housing 3 and the support 29 go up, while the slider 11 remains stationary under the action of the spring 31. The support 29 is disengaged from the slider 11 so that the gap m is again formed between them. Simultaneously, the gripping jaws 14 are pressed against the housing 3 and closed, gripping the head 9. The cap 17 (FIG. 3) or 20 (FIG. 4) of the casing 15 (FIG. 5) is pressed by the spring 16 to the contact surface 18 of the fuel assembly 10. The gripping means 1 with the fuel assembly 10 are raised inside the manipulator tube 2. As this takes place, the locking means 33 are forced from the apertures 34 into the gap m to abut against the slider 11, which prevents mutual displacement of the slider 11 and the housing 3 and, consequently, accidental opening of the jaws 14 of the gripping means 1.

The cooling medium is circulated through the spent fuel assembly 10 being handled. As shown by the arrows in FIG. 5, the cooling medium flows from the internal cavity of the manipulator tube 2 through the apertures 5 of the housing 3 into the cavity 12 of the slider 11 and between the gripping jaws 14 through the apertures 6 of the housing 3 into the internal cavity of the casing 15, wherefrom the cooling medium is directed through the apertures 7 of the head 9 into the internal cavity of the spent fuel assembly 10. The flow rate of the cooling medium passing along the external surface of the fuel assembly 10 through the gaps between the sealing member 4 and the internal surface of the manipulator tube 2 and between the cap 17 or 20 of the casing 15 and the contact surface 18 of the fuel assembly 10 is sufficiently small, so that the greater part of the cooling medium is directed into the internal cavity of the fuel assembly 10, whereby the afterheat is removed and overheating of the fuel assembly 10 is avoided, which otherwise could damage said spent fuel assembly 10. The circulation of the cooling medium is maintained during the entire process of transferring the spent fuel assembly 10 from the reactor core to a spent fuel assemblies storage.

The refuelling machine raises the manipulator tube 2, travels to a desired location and places the manipulator tube 2 above the socket where the spent fuel assembly 10 is to be installed. By successively bringing the manipulator tube 2 and the gripping means 1 down, the fuel assembly 10 is placed in the socket and released by the gripping means 1. The manipulator tube 2 is raised with the open gripping means 1 so that the head 9 of the fuel assembly 10 comes out from the housing 3 of the gripping means 1.

Other fuel assemblies 10 are handled in a similar manner.

The proposed gripping means for fuel assemblies of a nuclear reactor ensures optimum conditions for handling fuel assemblies, including spent fuel assemblies, as it helps to effectively remove afterheat by circulating a powerful flow of a cooling medium through the internal cavity of a fuel assembly being handled and thus avoids overheating of the fuel assembly which otherwise could be damaged.

What is claimed is:

1. A gripping means for fuel assemblies of a nuclear reactor, which have heads of the type that includes a cylindrical portion conjugated with a contact surface, an internal cavity and at least one aperture for passage of a cooling medium into said internal cavity, which aperture is provided in said cylindrical portion of the fuel assembly head, comprising:

a housing having an outer surface;

a sealing member secured on said outer surface of said housing;

a slider accomodated in said housing and adapted for motion relative to said housing;

first apertures for passage of said cooling medium, provided in said housing;

second apertures for passage of said cooling medium, provided in said housing;

a cavity provided in the body of said slider and intended for passage of said cooling medium coming into said cavity through the first apertures of said housing and exiting through the second apertures of said housing;

gripping jaws pivotably secured on said slider to come into contact with said housing and grip and release said head of said fuel assembly as said slider and said housing move in relation to each other;

a casing mounted on said housing, adapted for motion in relation to said housing and having an internal cavity, a first end face and a second end face;

a spring arranged on said outer surface of said housing, having a first end and a second end and interacting with its first end with the first end face of said casing;

a cap mounted on the second end face of said casing and having an end face whose shape corresponds to that of said contact surface of said head of said fuel assembly;

the length of said casing being selected so that as said gripping jaws grip said head of said fuel assembly, said end face of said cap comes into contact, under the action of said spring, with said contact surface of said head, thus forming a closed circuit for passage of said cooling medium through said internal cavity of said casing and through said aperture of said head into said internal cavity of said fuel assembly.

2. A gripping means as claimed in claim 1, wherein said cap is made integral with said casing.

3. A gripping means as claimed in claim 1, intended for fuel assemblies of a nuclear reactor, which have heads of the type that includes a cylindrical portion conjugated with a contact surface which is a cone-shaped projection, and at least one aperture for passage of a cooling medium into said internal cavity provided in said cylindrical portion of said head, wherein the surface of said end face of said cap is cone-shaped to come into contact with said cone-shaped projection, provision also being made for a spherical collar conjugated with said end face of said cap to come into contact with said cylindrical portion of said head.

4. A gripping means as claimed in claim 3, wherein said cap is made integral with said casing.

* * * * *